March 31, 1970     T. NESBITT-DUFORT     3,503,199
PLASTIC STRUCTURE REINFORCED WITH BRANCHED FILAMENTS
Filed Nov. 29, 1965     2 Sheets-Sheet 1

INVENTOR.
Timothy Nesbitt Dufort
BY Michael S. Striker
Attorney

United States Patent Office 3,503,199
Patented Mar. 31, 1970

3,503,199
PLASTIC STRUCTURE REINFORCED WITH BRANCHED FILAMENTS
Timothy Nesbitt-Dufort, Langley, near Macclesfield, England, assignor to Ernest Scragg and Sons Limited, Macclesfield, England
Continuation-in-part of application Ser. No. 323,505, Nov. 13, 1963. This application Nov. 29, 1965, Ser. No. 510,190
Claims priority, application Great Britain, Nov. 13, 1962, 42,796/62
Int. Cl. D02g 3/36; B29h 17/28
U.S. Cl. 57—149       13 Claims

ABSTRACT OF THE DISCLOSURE

A reinforced plastic structure in which elongated reinforcing means including filament means having a plurality of integral branch means projecting therefrom are embedded permanently in a body of plastic material which permanently surrounds such filaments means and branch means, whereby the reinforcing means is permanently anchored in the plastic material.

---

The present invention is a continuation-in-part of my copending application entitled Textiles and filed on Nov. 13, 1963, Ser. No. 323,505, now abandoned.

The present invention relates to a reinforced plastic structure.

More specifically, the invention relates to reinforcement means for use in making cords suitable for reinforcement purposes.

Still more specifically the invention relates to filamentary materials for use in constructing such cords for purposes of reinforcing tire carcasses.

It is well known that tire carcasses, particularly for automotive vehicles, are reinforced by disposing within the tire material cords of various materials. Most frequently used for this purpose are cords made from plastic filamentary material. Such cords are incorporated in the tire material at the time when the tire is vulcanized.

As pointed out, various types of such cords are known. The present invention deals with a plastic filamentary material for making such cords and aims to provide reinforcing materials which will be of greater reliability and reinforcing action than those previously known in the art.

It is therefore a general object of the present invention to provide a filamentary material for reinforcing purposes.

A still more specific object of the present invention is to provide a filamentary material of the type set forth above, which is provided with portions serving to locate and position the filamentary material more reliably in the surrounding material of the tire.

A still more specific object of the present invention is to provide a filamentary material of the type described above which serves to at least largely prevent movement of the filamentary material within the finished tire during the use of the latter.

In accordance with one feature of my invention I provide a reinforced plastic structure, particularly a tire carcass, which comprises an elongated reinforcing means having filament means which includes a plurality of projecting branch means, and a body of plastic material surrounding the filament means so that at least some of the branch means are embedded and anchored in the plastic material.

Filament means of this type may be of various different configurations. They will be of synthetic thermoplastic material and will have a trunk and branches which may be of identical or substantially identical cross-sectional dimension. Preferably, at least some of the branches will have a length between two and ten times their average cross-sectional dimensions.

The branches may be spaced at regular or irregular intervals along the trunk, or they may be spaced at substantially irregular intervals with at least some of the branches spaced in regular relationship. Preferably, the trunk will be continuous. A cord or thread constructed with the filamentary material set forth hereinabove will preferably be twisted from a plurality of such filaments only to such a degree that the projecting branches of each of the filaments will hold adjoining filaments apart so that, during construction of the tire, the moldable material of the tire will flow between the individual filaments of the cord and fill the spaces therebetween. Again, a cord constructed from such filaments may be also twisted to a greater degree which is sufficient to deflect the branches of the respective filaments, so that the filament trunks are substantially in contact with each other and no or very little space will remain therebetween.

A cord constructed in accordance with the present invention may also comprise a core of continuous filaments which are not provided with branches as set forth hereinabove, and such core may be surrounded by filaments which are provided with these branches.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
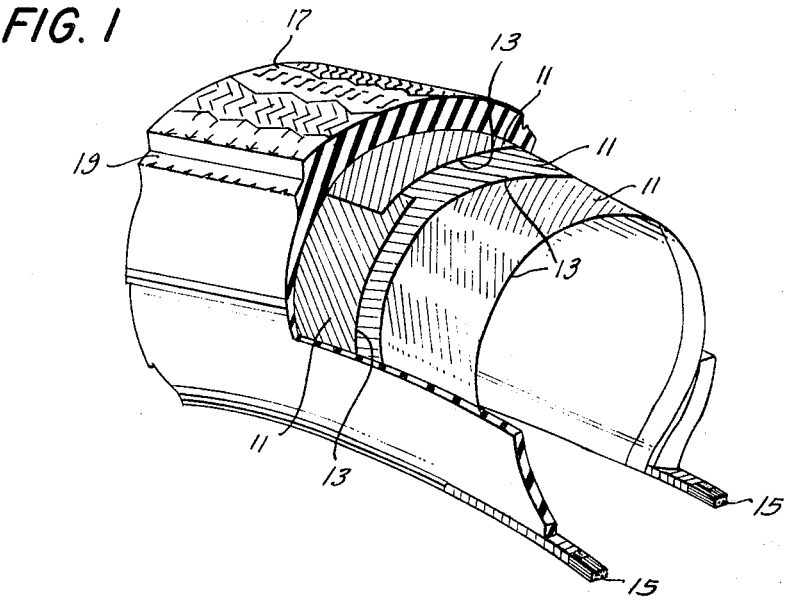
FIG. 1 is a perspective view, partly in section, through a cross-ply vehicle tire.

Discussing now the drawing in detail, and firstly FIG. 1 thereof, it will be seen that the tire cords 11 shown there are arranged in a plurality of layers 13, in each of which the cords 11 extend parallel to one another. In adjacent ones of the layers 13, the cords 11 extend at an angle to one another. The layers 13 are secured to wire beads 15 which are well known in the art, and to the ground-contacting surface or tire sole 17. The side walls 19 and the layers 11 of reinforcing cords 13 are bonded together and to the wire beads 15 under application of heat and pressure.

Figure 2:
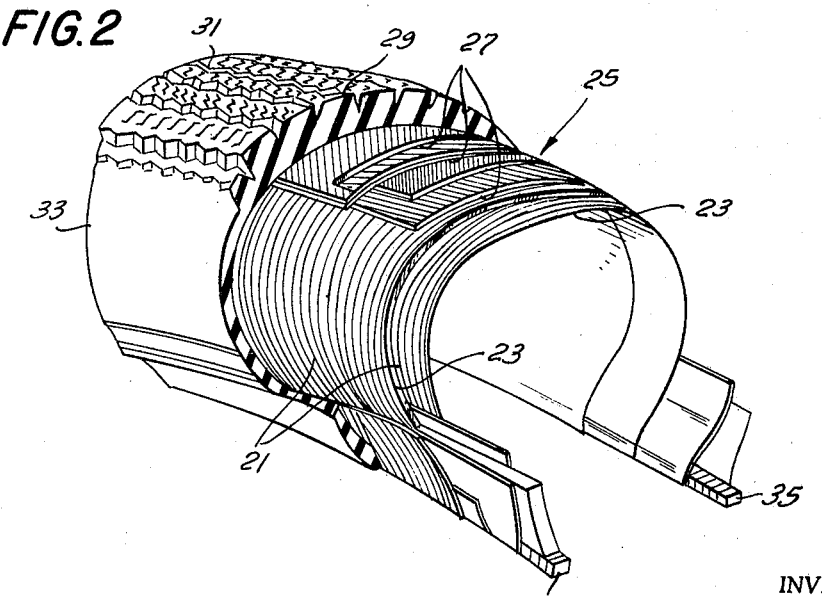
FIG. 2 is a view similar to FIG. 1, but showing a radial-ply tire.

In FIG. 2 there is shown a radial-ply, rigid breaker construction of a tire in which the tire cords 21 are arranged in a plurality of layers or plies 23. In each of these layers 23 the cords 21 extend parallel to one another and transversely to the circumference of the tire. A rigid breaker belt 25 overlies the plies 23 and comprises between six and four layers 27 of tire cords 29 which are bonded in a rubber matrix circumferentially of the tire. In each layer 27 of the breaker belt the cords 29 extend parallel to one another, and in adjacent layers 27 the cords 29 extend at an angle to one another. The layers 27 of the breaker belt are bonded to the ground-contacting surface or sole 31, and the tire sole, the side wall 33 and the radial plies 23 are bonded together and to the wire beads 35, again under application of heat and pressure.

Figure 3:
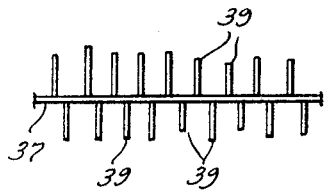
FIG. 3 is a diagrammatic view of a first form of branched filaments.
Figure 4:
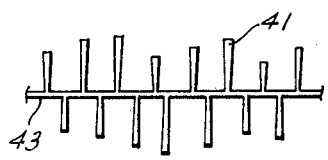
FIG. 4 is a diagrammatic view of another form of branched filament.
Figure 5:
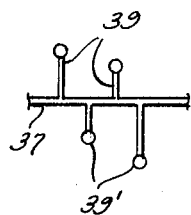
FIG. 5 is a modified embodiment of the branched filament shown in FIG. 3.

The cords employed in the layer 13 of the cross-ply tire construction and in the radial plies 23 and/or the breaker belt 25 of a radial ply tire construction may be composed of the branched filaments shown in FIGS. 3, 4 and 5.

Discussing firstly the filament shown in FIG. 3 it will be seen that it is provided with a filamentary trunk 37 and with branches 39 which extend transversely of the trunk and are integral therewith. These branches 39 are spaced apart at intervals along the trunk 39 and may be spaced at regular or irregular intervals. The branches may be of a length of between two and ten times their average cross-sectional diameter, and their cross-sectional area is preferably the same as that of the trunk.

In FIG. 4 there is shown another embodiment of the filament which has branches 41 whose cross-sectional area increases in the direction away from the trunk, contrary to the branches 39 in FIG. 3 whose cross-sectional area is constant throughout their entire length. As is seen in FIG. 4, the branches 41 diverge in the direction away from the trunk 43. In FIG. 5 there is shown another embodiment in which the trunk 37 is provided with branches 39 which, at their outermost free ends spaced from the trunk, carry knob-like portions 39'. Of course, the purpose of these portions 39' or of the outwardly diverging portions of the branches 41 is to anchor these branches still more firmly in a rubber matrix, such as the material of the tire.

The filaments shown in FIGS. 3–5 may be used for making tire cords, such as are used in the tire constructions shown in FIGS. 1 and 2. For this purpose a plurality of filaments such as shown in FIGS. 3–5 will be twisted and heat set, and will thus form individual ones of the reinforcing cords. The twist may be applied to a greater or lesser degree, depending on whether it is desired to have the projecting branches of each of the filaments extend substantially outwardly from the respective trunk so that the branches of adjacent filaments keep the filaments apart from one another, whereby space remains between them into which the material of the rubber matrix may flow while soft, or whether it is desired to preclude such introduction of material between the individual filaments, in which case the filaments will be twisted to a degree sufficient to deflect their branches substantially towards each other. In this latter case the trunks of the filaments will be in contact with each other, and no spaces will remain for entry of the material of the rubber matrix.

Figure 6:
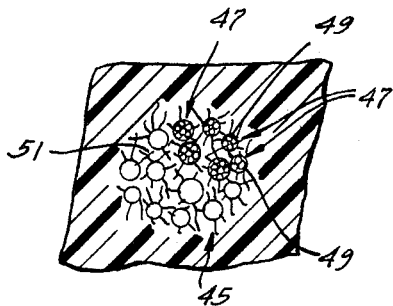
FIG. 6 is a cross section, shown diagrammatically and greatly enlarged, through a first form of tire reinforcing cord bonded in a rubber matrix.

A tire cord, which is composed of branched filaments such as the ones in FIGS. 3–5 and is inserted in a rubber matrix, is shown in FIG. 6. It is clearly evident from this figure that the cord 45 is composed of individual threads 47, and that each of these threads comprises a plurality of branched filaments 49 which may be constructed in accordance with any one or several of the embodiments of FIGS. 3–5.

The threads 47 are made by twisting together a plurality of the branched filaments 49, in the manner outlined earlier. Some of the branches of these filaments will extend inwardly toward one another, and are thus not visible in the drawing. Others will extend outwardly and will intertwine with the branches of other adjacent filaments, as shown in FIG. 6. The inwardly directed branches of the filaments tend to keep the trunks thereof apart, and the outwardly extending branches of the threads made from such filaments tend to keep adjacent ones of the threads apart when the latter are in turn twisted into tire cords 45.

Figure 7:
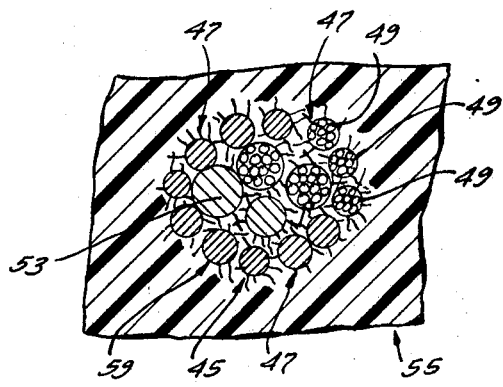
FIG. 7 is a view similar to FIG. 6 but showing a second form of tire reinforcing cord, again bonded in a rubber matrix.

In another construction, shown in FIG. 7, the cord may be provided with core threads 53 which may be continuous filament trunks completely devoid of branches, or else having only very few such branches such as are shown at 57 in FIG. 7. Such core threads may be surrounded by a cortex or shell 59 of threads 47, each of which is composed entirely of branched filaments 49 constructed in accordance with FIGS. 3–5.

Cords such as those illustrated in FIGS. 6 and 7 are bonded side-by-side in the rubber matrix and the soft rubber penetrates between the trunks of the individual filaments and around the branches so that, when the rubber sets, it forms the matrix which tightly engages the branches and trunks whereby movement of the filaments within the material of the tire is precluded. This, of course, is assisted in turn by the fact that in at least some of the embodiments the branches increase in cross-sectional area outwardly away from the respective trunk.

The construction of tires utilizing these cords is conventional and well known in the art. The cord matrices are cut and laid up with bead wires in a tire mold in accordance with the type of tire which is to be produced, that is as a cross-ply tire, or a radial ply tire. The tire sole and side walls are then molded under heat and pressure over the cord plies and the bead wires, so that a bond is formed between the tire sole and side walls and adjacent cord plies on the one hand, and between the cord plies themselves on the other during the molding process.

Of course it will be understood that the branched filaments as shown in FIGS. 3–5 may be made in various well known ways, for instance by setting filament-forming material in a mold which comprises a roller having a hard-metal surface which is engraved with a continuous pattern, consisting of a central channel and laterally extending branches of a cross-section comparable to that of the central channel, and of a length between two and ten times the average cross-sectional dimension of the branches, or even of greater length. The roller may press against another roller having a smooth surface, or having a complementary pattern engraved thereon. Material fed into the mold is drawn into filaments in the drawing apparatus which is well known in the art and is provided with means for bending the branches parallel with the trunks so that both are drawn to a similar extent. Threads are formed from the drawn filaments by twisting and heat setting, and cords are subsequently formed from the threads in a known manner. The twist, as has been mentioned before, may be such that the individual filament trunks are held apart so that, when the cords are incorporated in a plastic material such as natural or synthetic rubber for tires, the material will penetrate between the trunk and, when it sets, will form a matrix in which the trunks and the filamentary branches are tightly engaged without any tendency or possibility for the cords to become displaced relative to the molded material surrounding them.

In another manner of producing the filaments the material for them may be extruded from a die in form of a cylinder having radially extending fins on its outer or inner surfaces. A continuous strip is then cut from the cylinder by a blade which travels over the cylindrical surface in a helical path, so that the strip has sideways extending branches. The strip is then drawn in the manner described above to form the branched filaments which are subsequently twisted and heat set into threads, from which cords are thereafter made.

On making the cords it is also possible, as mentioned before, to form the branched filaments as described above and then to twist and heat set them into threads and subsequently to cord them so that the filamentary trunks are held together in such a manner that moldable material in which the cords are to be incorporated cannot penetrate between the filamentary trunks. However, filamentary branches will still extend radially outwardly of the cord and these branches will become tightly embedded in the material when the latter sets around them, so that the cord is thereby held against displacement in the material.

It will be understood that each of the elements described above, or two or more together, may also find a useful application in other types of plastic structures differing from the types described above.

While the invention has been illustrated and described as embodied in a plastic structure, it is not intended to be limited to the details shown, since various modifications and structural changes may be made without departing in any way from the spirit of the present invention.

What is claimed as new and desired to be secured by Letters Patent is:

1. A reinforced plastic structure, comprising the combination of elongated synthetic plastic reinforcing means including filament means, said filament means comprising elongated trunk means and integral branch means spaced apart from one another and diverging in cross-sectional dimension away from said trunk means; and a body of plastic material permanently surrounding said filament means so that at least some of said branch means are permanently embedded and enclosed in said plastic material.

2. A structure as defined in claim 1, wherein said integral branches are spaced from one another in longitudinal direction of said trunk means.

3. A structure as defined in claim 2, wherein said integral branches are longitudinally spaced at random intervals with respect to said trunk means.

4. A structure as defined in claim 1, wherein the cross-sectional diameter of said integral branches is substantially the same as the cross-sectional diameter of said trunk means.

5. A structure as defined in claim 1, wherein said integral branches are of a length corresponding to between two and ten times their average cross-sectional diameter.

6. A structure as defined in claim 5, wherein said integral branches have outer free ends, and wherein said outer free ends are respectively provided with enlargements which serve to anchor said branches more firmly in said plastic material.

7. A reinforced plastic structure, comprising the combination of elongated synthetic plastic reinforcing means including a plurality of filament means each having an elongated trunk, and integral branch means including a plurality of branches spaced along the respective trunks projecting therefrom and diverging in cross-sectional dimension in the direction away from such trunks; and a body of plastic material permanently surounding said filament means so that at least some of said branch means are permanently embedded and enclosed in said plastic material.

8. A structure as defined in claim 7, wherein said filament means are twisted together and jointly constitute a stranded cord.

9. A structure as defined in claim 8, wherein at least some of said branches project outwardly from said cord, and wherein said reinforcing means comprises a plurality of said cords disposed in adjacent relationship, said branches projecting outwardly from the respective cords keeping adjacent cords apart from each other, and said plastic material surrounding said cords and filling the spaces therebetween and between said branches.

10. A structure as defined in claim 9, wherein said reinforcing means comprises at least one elongated filamentary core, and wherein said cords are coextensive with said core and surround the same.

11. A structure as defined in claim 10, wherein said core is provided with at least some branches projecting therefrom and interengaging with the projecting branches of the surrounding cords.

12. A structure as defined in claim 7 wherein said filament means are loosely twisted together with spacing from one another and jointly constitute a stranded cord, and wherein some of said branches of the respective filament means project inwardly toward each other and maintain spacing between said filament means, and others of said branches project outwardly away from said cord, said plastic material surrounding said cord and filling the spaces existing therewithin between said filament means.

13. A structure as defined in claim 7, wherein said filament means are tightly twisted together in abutting relationship of the respective trunks thereof and jointly constitute a stranded cord, and wherein at least some of said branches project outwardly away from said cord.

References Cited

UNITED STATES PATENTS

| 2,053,123 | 9/1936 | Alles | 152—359 |
| 3,050,070 | 8/1962 | Sidelman | 132—39 |
| 3,161,708 | 12/1964 | Scragg | 264—177 |
| 3,243,339 | 3/1966 | Scragg et al. | 161—179 |

ROBERT F. BURNETT, Primary Examiner

ROGER L. MAY, Assistant Examiner

U.S. Cl. X.R.

57—153; 152—359; 161—88, 175, 177, 144